(12) United States Patent (10) Patent No.: US 8,306,066 B2
Shibasaki et al. (45) Date of Patent: Nov. 6, 2012

(54) TRANSMISSION DEVICE

(75) Inventors: Masatoshi Shibasaki, Yokohama (JP);
Takao Fukushima, Funabashi (JP);
Toshiyuki Atsumi, Kamakura (JP);
Yoshio Nogi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 12/604,113

(22) Filed: Oct. 22, 2009

(65) Prior Publication Data

US 2010/0111111 A1 May 6, 2010

(30) Foreign Application Priority Data

Oct. 24, 2008 (JP) ................................. 2008-273721

(51) Int. Cl.
*H04J 3/00* (2006.01)
(52) U.S. Cl. ........................................ 370/474; 370/498
(58) Field of Classification Search .................. None
See application file for complete search history.

(56) References Cited

U.S. PATENT DOCUMENTS

| | | | |
|---|---|---|---|
| 6,389,014 B1* | 5/2002 | Song | 370/376 |
| 7,586,925 B2* | 9/2009 | Smith et al. | 370/399 |
| 7,986,700 B2* | 7/2011 | Fourcand | 370/395.42 |
| 2004/0028051 A1* | 2/2004 | Etemadi et al. | 370/395.1 |
| 2005/0117571 A1* | 6/2005 | Dyke | 370/355 |
| 2006/0062366 A1* | 3/2006 | Tiruthani et al. | 379/201.01 |
| 2006/0153179 A1* | 7/2006 | Ho et al. | 370/386 |
| 2008/0219261 A1* | 9/2008 | Lin et al. | 370/392 |
| 2009/0225781 A1* | 9/2009 | Yendluri | 370/474 |

OTHER PUBLICATIONS

Series Y: Global Information Infrastructure, Internet Protocol Aspects and Next Generation Networks; International Telecommunication Union; ITU-T Rec. Y.1413; Mar. 2004; Geneva, Switzerland.
Series G: Transmission Systems and Media, Digital Systems and Networks; International Telecommunication Union; ITU-T Rec. G.703; Nov. 2001; Geneva, Switzerland.
Series G: Transmission Systems and Media, Digital Systems and Networks; Series: Y: Global Information Infrastructure, Internet Protocol Aspects and Next-Generation Networks; International Telecommunication Union; ITU-T Re. G.707/Y.1322; Jan. 2007; Geneva, Switzerland.
Synchronous Optical Network (SONET) Transport Systems: Common Generic Criteria; Telcordia Technologies GR-253-Core, Issue 3, Sep. 2000.

* cited by examiner

*Primary Examiner* — Min Jung
(74) *Attorney, Agent, or Firm* — Foley & Lardner LLP

(57) ABSTRACT

A transmission device comprises first interfaces each of which receives time-division multiplexed signals from an external device in units of frames, a switch which is connected with the first interfaces and sets paths of the signals received from the first interface in regard to each packet, and second interfaces each of which is connected with the switch, receives the signals from the first interface via the switch, and transmits the received signals to a different transmission device in units of packets. The first interface selects signals having the same destination from the signals contained in the received frame and stores the selected signals having the same destination in one packet.

6 Claims, 12 Drawing Sheets

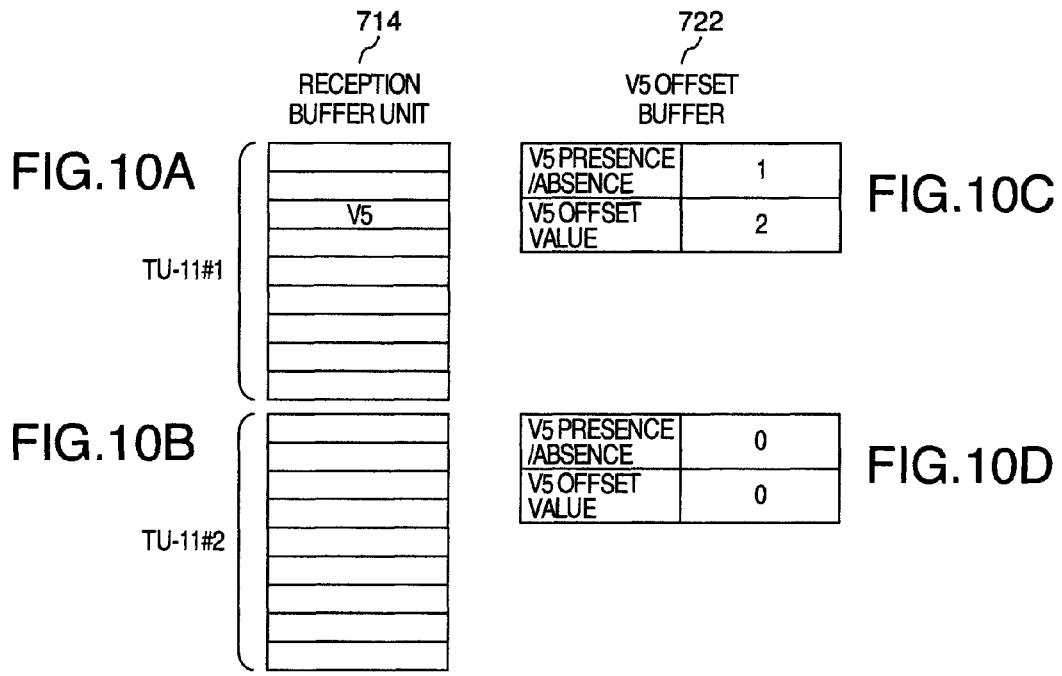
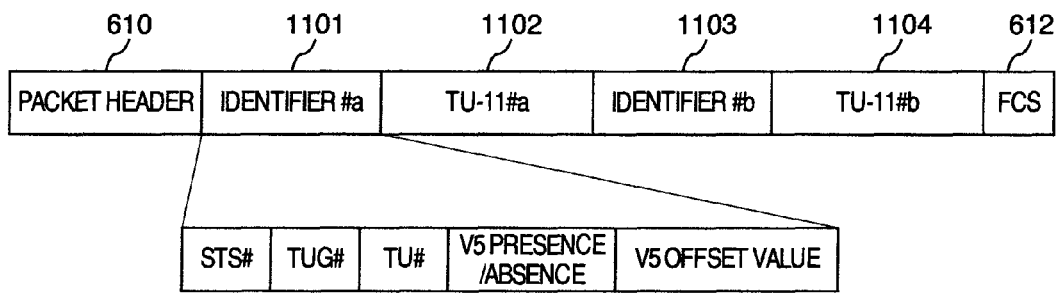

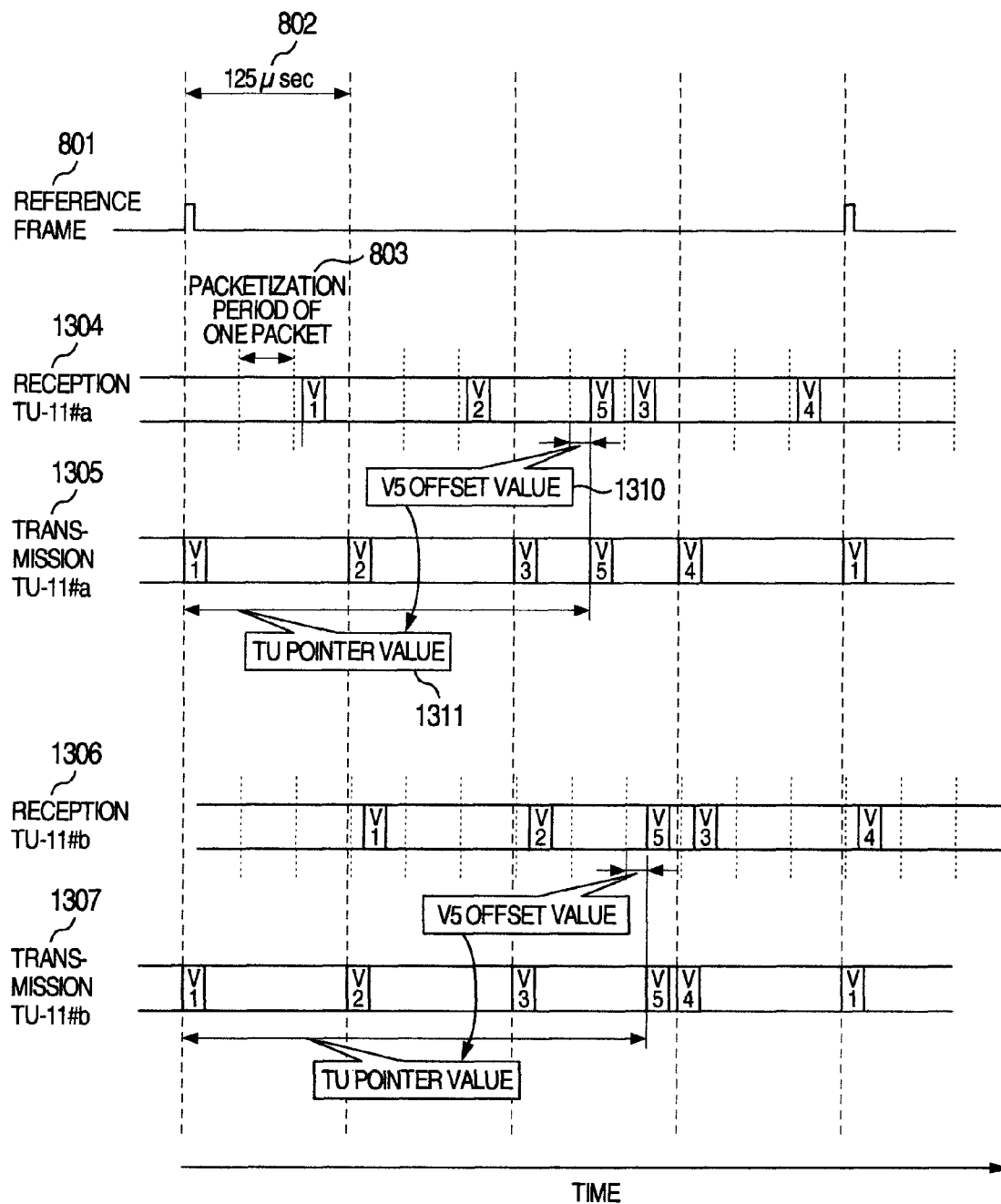

TRANSMISSION DEVICE

INCORPORATION BY REFERENCE

The present application claims priority from Japanese applications JP2008-273721 filed on Oct. 24, 2008, the content of which is hereby incorporated by reference into this application.

BACKGROUND OF THE INVENTION

The present invention relates to a transmission device and a transmission method for transmitting signals by accommodating time-division multiplexed signals in signals in a packet format.

Backbone networks of communication carriers are being progressively switched and shifted to full-IP•Ethernet networks in recent years. In such circumstances, already-existing backbone networks employing the time-division multiplexing technology (based on SDH/SONET, for example) and newly emerging backbone networks transmitting information in a packet format (based on IP•Ethernet, for example) are coexisting.

In order to eliminate inefficiency of equipment, maintenance, etc. due to the above coexistence of different types of networks, a lot of studies are being conducted in order to consolidate the backbone networks based on SDH/SONET into those based on IP•Ethernet by packetizing the conventional SDH/SONET signals, PDH/DS-n signals, etc. into IP•Ethernet packets. As a result of the studies, the T-MPLS (MultiProtocol Label Switching) technology has been established and specified in ITU-T Y. 1370.1, Y. 1371, Y. 1381, etc.

In low-speed paths (TU-11, TU-12, etc.) specified in ITU-T G.707 (standard of SDH), however, the number of bytes of one path in one STM-0 frame (51.84 Mbit/sec) is 27 bytes (25 bytes of genuine user traffic area excluding management bytes) (TU-11), 36 bytes (35 bytes of genuine user traffic area excluding a management byte) (TU-12), etc. Thus, depending on the length of the unit of the packetization, the occupancy ratio of non-payload areas (overhead added for packetization, inter-frame gaps, etc.) in the whole communications traffic increases and that of the payload decreases. As a method for preventing the decrease in the occupancy ratio of the payload, it is possible to temporarily accumulate the low-speed paths (basically in units of frames) for a sufficiently long time and then packetize the accumulated paths into one packet as specified in Section 9.1.1 of ITU-T Y.1413 (03/04). For example, by accumulating TU-11 paths for ten STM-0 frames and packetizing the accumulated paths, the occupancy ratio of the payload can be multiplied by ten. The aforementioned ITU-T Y.1413 recommends accumulation of N units (N: positive integer, 1 unit=27 bytes (1 frame)) and packetization of the accumulated N units into one packet (see ITU-T Y.1413, ITU-T G.703, ITU-T G.707, Telcordia GR-253-CORE, etc. for details related technologies).

SUMMARY OF THE INVENTION

However, the aforementioned method increasing the number of frames accumulated before the packetization causes at least a delay corresponding to the number of the accumulated frames, by which the low-delay transmission capability of SDH/SONET as an advantage of SDH/SONET is impaired. In other words, accumulating a larger number of time-division multiplexed signals for the packetization in order to enhance the accommodating efficiency of a packet causes an increase in the time necessary for the accumulation and results in extension of the signal delay time.

In order to shorten the delay time, reducing the amount of the accumulation of time-division multiplexed signals is a possible method. However, the length of the packet can not be set at less than 64 bytes (minimum packet length specified in IEEE 802.3). Assuming a case where TU-11 data (one frame length: 27 bytes) are accommodated in a T-MPLS frame, for example, the minimum length of the payload of the T-MPLS frame (obtained by subtracting the T-MPLS packet header length from the minimum packet length) is 34 bytes. Thus, in order to store TU-11 data in a T-MPLS payload without wasting space, TU-11 data of at least (64−34)/27 frames have to be accumulated and stored and that causes a corresponding delay time. Further, in such cases where the packet length is short (e.g. 64 bytes), the accommodating efficiency is necessitated to be low since the packet header is considerably large in comparison with the payload.

As described above, in the method temporarily accumulating time-division multiplexed signals and packetizing the accumulated signals, there is a trade-off relationship between the accommodating efficiency (in the case where time-division multiplexed signals are stored in a packet) and the transmission delay of the time-division multiplexed signals (improvement of either of them affects the other). Thus, a transmission device capable of realizing high accommodating efficiency and low delay in the accommodating of SDH/SONET signals in packets (especially in the accommodating of low-order paths in packets) is being requested.

In accordance with an aspect of the present invention, there is provided a transmission device comprising first interfaces each of which receives time-division multiplexed signals from an external device in units of frames, a switch which is connected with the first interfaces and sets paths of the signals received from the first interface in regard to each packet, and second interfaces each of which is connected with the switch, receives the signals from the first interface via the switch, and transmits the received signals to a different transmission device in units of packets. The first interface selects signals having the same destination from the signals contained in the received frame and stores the selected signals having the same destination in one packet.

With the transmission device configured as above, both the high accommodating efficiency (reduction of the increase in the occupancy ratio of the non-payload areas (e.g. overhead for packetization)) and the low delay (reduction of the delay caused by the packetization) can be realized in cases where SDH/SONET signals are packetized and transmitted.

Other objects, features and advantages of the invention will become apparent from the following description of the embodiments of the invention taken in conjunction with accompanying drawings.

BRIEF DESCRIPTION OF THE DRAWINGS

FIGS. 10A-10D are schematic diagrams showing an example of data stored in a reception buffer unit and a V5 offset buffer of the SDH interface unit.

FIG. 11 is a schematic diagram showing an example of the format of the T-MPLS frame.

FIG. 13 is a schematic diagram showing an example of calculation of a TU pointer value.

DETAILED DESCRIPTION OF THE EMBODIMENTS

Figure 1:
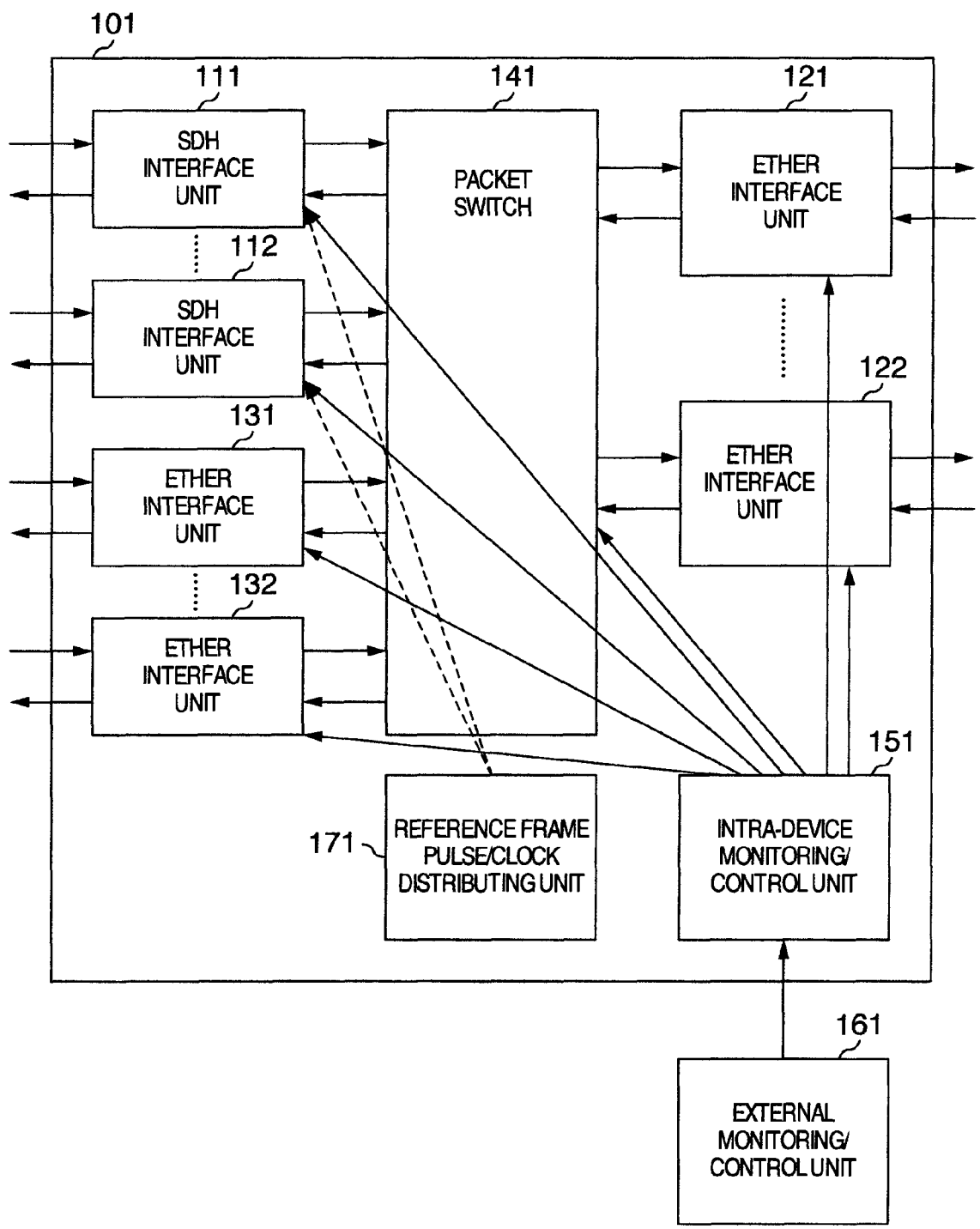
FIG. 1 is a block diagram showing the configuration of a packet transmission device in accordance with an embodiment of the present invention.

Referring now to the drawings, a description will be given in detail of a preferred embodiment in accordance with the present invention.

Figure 2:
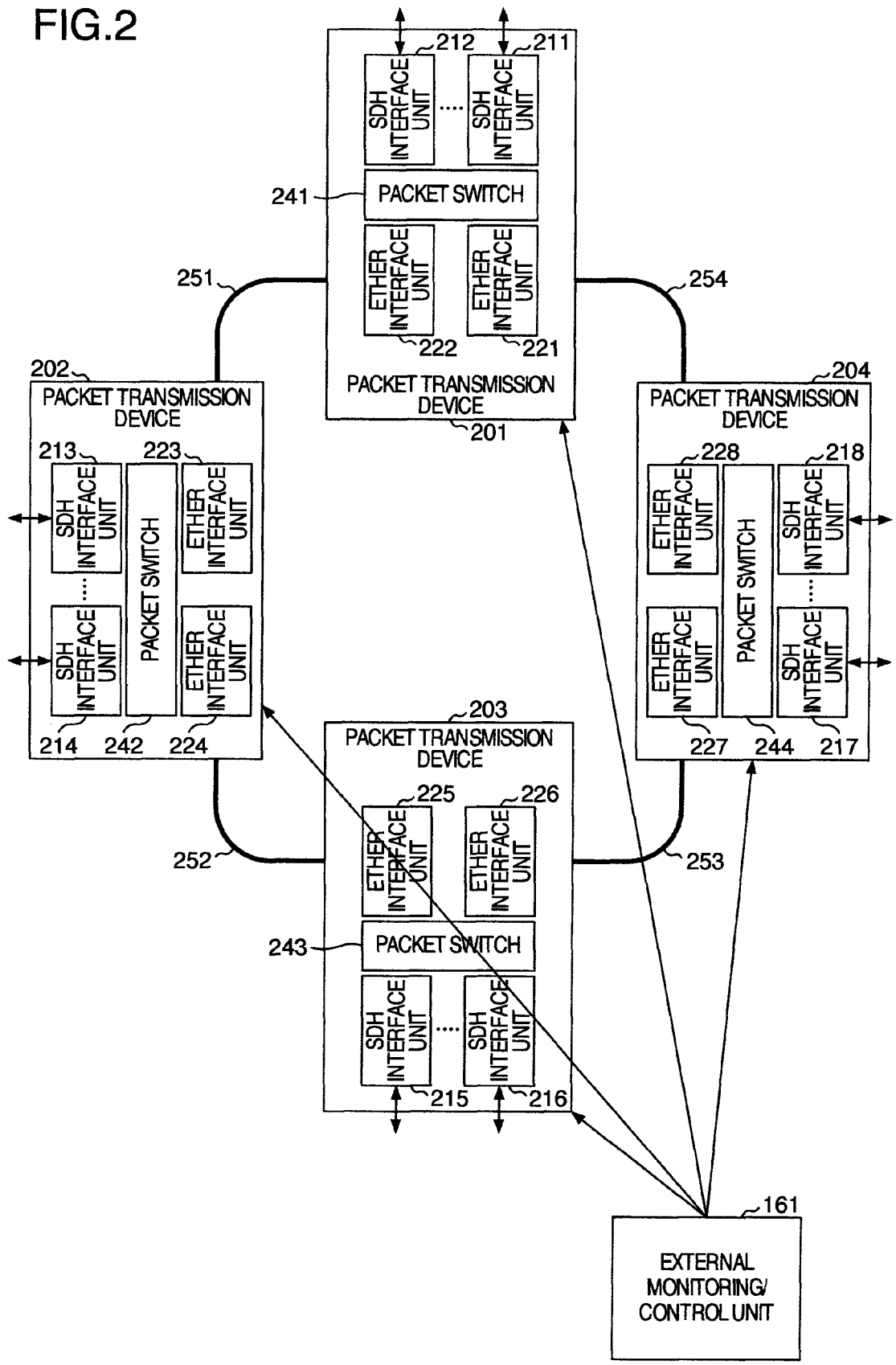
FIG. 2 is a schematic diagram showing an example of a network in a ring configuration formed by the packet transmission devices in accordance with the embodiment.

FIG. 2 is a schematic diagram for explaining a network in which packet transmission devices in accordance with an embodiment of the present invention are connected together in a ring shape. In FIG. 2, an example of a ring configuration including four packet transmission devices 201-204 is shown. The packet transmission devices 201-204 are connected together by connecting their Ethernet interface units 221-228 in the ring shape via optical fiber cables 251-254. The packet transmission devices 201-204 are connected also to external connection devices via SDH (Synchronous Digital Hierarchy) interface units 211-218. In each packet transmission device (201-204), SDH signals sent from an external connection device is accommodated by an SDH interface unit (211-218), converted into T-MPLS (MultiProtocol Label Switching) frames (packets), and thereafter transferred by a packet switch (241-244) to an appropriate Ethernet interface unit (221-228) according to T-MPLS labels.

Incidentally, while the explanation of this embodiment will be given assuming that SDH is employed as the protocol of the time-division multiplexed signals, T-MPLS (Ether) is employed as the protocol of the packet signals and each packet transmission device (201-204) accommodates SDH signals in T-MPLS frames (packets), this embodiment is of course generally applicable to a variety of cases where time-division multiplexed signals are accommodated in signals in a packet format (even when other protocols are employed).

Figure 3:
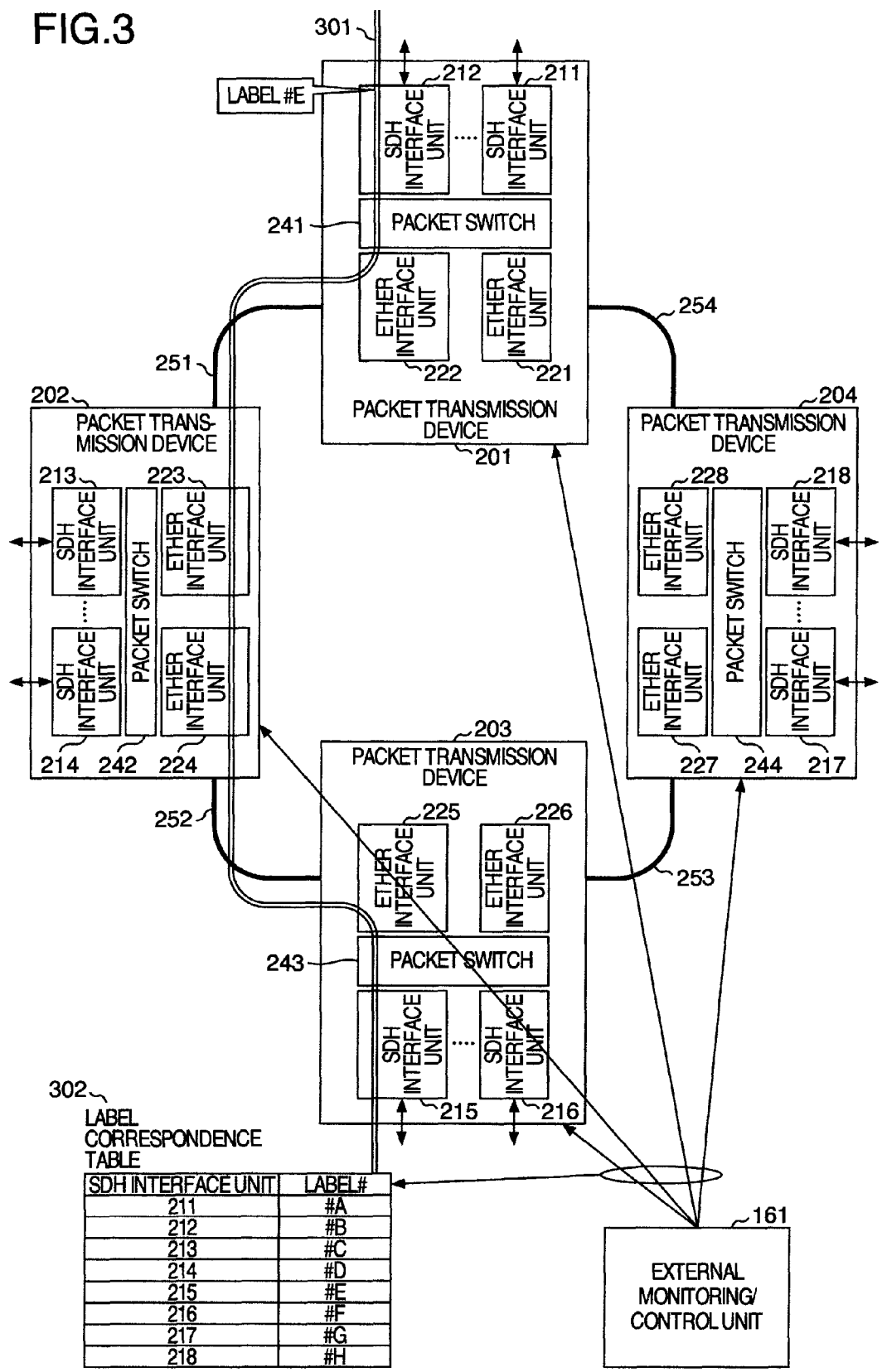
FIG. 3 is a schematic diagram showing an example of a path setting in the ring configuration.

A VC (Virtual Container) path transmission method in the ring configuration will be explained below referring to FIG. 3. In this example, a case where a TU (Tributary Unit) path 301 (multiplexed in an SDH signal accommodated by the SDH interface unit 212 of the packet transmission device 201) is connected to an SDH signal in the SDH interface unit 215 of the packet transmission device 203 will be explained. First, the SDH interface unit 212 receiving an SDH signal separates TU signals from the SDH signal and accommodates the separated TU signals into a T-MPLS frame. Subsequently, the SDH interface unit 212 attaches a label to the T-MPLS frame according to an instruction from an external monitoring/control unit 161. Incidentally, the external monitoring/control unit 161 also distributes routing information to the packet transmission devices 201-204.

The external monitoring/control unit 161 assigns a label to each SDH interface unit (211-218) in the ring and distributes a label correspondence table 302 (indicating the correspondence between the labels and the SDH interface units 211-218) to the packet transmission devices 201-204, for example. The SDH interface unit 212 attaches a label "E" (assigned to the SDH interface unit 215 as the destination) to the T-MPLS frames being transmitted in the TU path 301. Each T-MPLS frame (having a label) which has been transferred to the packet switch 241 is switched and forwarded by the packet switch 241 to an appropriate path (route) according to the label correspondence table 302, by which the T-MPLS frames (having the label "E") are transferred to the Ethernet interface unit 222. Since the Ethernet interface unit 222 is connected to the Ethernet interface unit 223 of the packet transmission device 202 via the optical fiber cable 251, the T-MPLS frames are transmitted and to the packet switch 242 via the Ethernet interface unit 223. The packet switch 242 transfers the T-MPLS frames to the Ethernet interface unit 224 according to the label correspondence table 302 held in the packet transmission device 202. The Ethernet interface unit 224 transmits the T-MPLS frames to the Ethernet interface unit 225 of the packet transmission device 203 which is connected with the Ethernet interface unit 224 via the optical fiber cable 252.

The packet transmission device 203 similarly refers to its label correspondence table 302 and thereby transfers the T-MPLS frames to the SDH interface unit 215 via the Ethernet interface unit 225 and the packet switch 243. The SDH interface unit 215 assembles SDH frames using the received T-MPLS frames and then transmits the assembled SDH frames to the external connection device connected thereto.

Next, the configuration of the packet transmission device in accordance with this embodiment will be explained referring to FIG. 1. In the packet transmission device (101) shown in FIG. 1, SDH interface units 111 and 112 (accommodating SDH signals specified in ITU-T G.707) are placed on one side of a packet switch 141, and Ether interface units 121, 122, 131 and 132 (accommodating Ether signals specified in IEEE 802.3) are placed on the other side of the packet switch 141. The Ether interface units 121 and 122 are connected to the ring shown in FIG. 2, while the Ether interface units 131 and 132 are connected to external connection devices similarly to the SDH interface units 111 and 112. The packet transmission device 101 further includes an intra-device monitoring/control unit 151 which receives signals from the external monitoring/control unit 161 and issues instructions to the SDH interface units, the Ether interface units and the packet switch 141.

Each SDH interface unit 111, 112 accommodates an SDH signal transmitted from an external connection device, converts the SDH signal into T-MPLS frames, and attaches a label (corresponding to the destination of the low-order path (e.g. TU-11) multiplexed in the SDH signal) distributed from the intra-device monitoring/control unit 151 to each T-MPLS frame. Each Ether interface unit 121, 122 accommodates (receives) an Ether signal (in the T-MPLS format) transmitted from the adjacent packet transmission device in the ring. Meanwhile, each Ether interface unit 131, 132 accommodates (receives) an Ether signal transmitted from an external connection device and converts the Ether signal into the T-MPLS format (T-MPLS frames) while attaching a label (corresponding to the destination of the Ether signal) distributed from the intra-device monitoring/control unit 151 to each T-MPLS frame. The packet switch 141 recognizes the label of each T-MPLS frame inputted from an SDH interface unit (111, 112) or Ether interface unit (121, 122, 131, 132)

and thereby transfers the T-MPLS frame to an appropriate interface unit according to the label correspondence table 302 held by the intra-device monitoring/control unit 151.

The intra-device monitoring/control unit 151 generates a table representing the correspondence between the SDH low-order paths and the T-MPLS labels and the correspondence between the T-MPLS labels and the interface units based on path setting information supplied from the external monitoring/control unit 161 and distributes the table to the interface units 111, 112, 121, 122, 131 and 132 and the packet switch 141. A reference frame pulse/clock distributing unit 171 distributes SDH reference frames to the SDH interface units 111 and 112. Each SDH interface unit 111, 112 assembles the SDH frames and creates TU pointers with reference to the reference frames.

Figure 4:
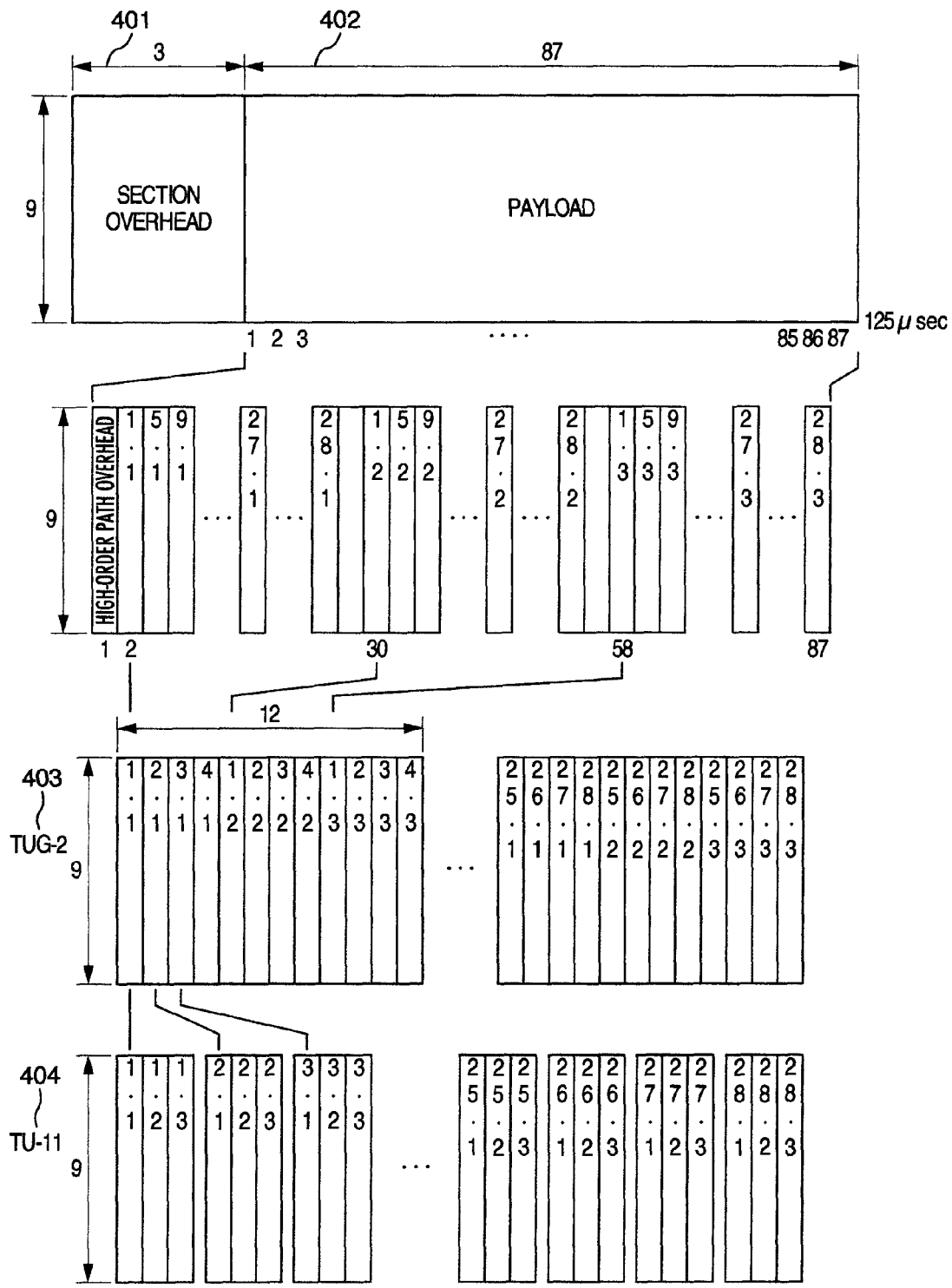
FIG. 4 is a schematic diagram showing an example of rules for multiplexing TU-11s specified in ITU-T G.707.

Next, the format of the SDH frame will be explained referring to FIG. 4 by taking a case where TU-11 paths are accommodated in an STM-0 frame (specified in ITU-T G.707) as an example. The STM-0 frame is made up of a section overhead 401 storing management information and a payload 402 as a data area. ITU-T G.707 specifies that the whole area (section overhead+payload) of an SDH frame should be transmitted in 125 μseconds. One TU-11 (404) is made up of 9 rows×3 columns=27 bytes. Four TU-11s are accommodated in a TUG-2 (403). Since seven TUG-2s are accommodated in the STM-0 payload 402, a total of twenty-eight TU-11s are accommodated in the STM-0 payload 402. Thanks to such multiplexed hierarchical structure, the time slot positions of each TU-11 path in the payload are fixed and the delay time (time interval) between TU-11s is equalized.

Figure 5:
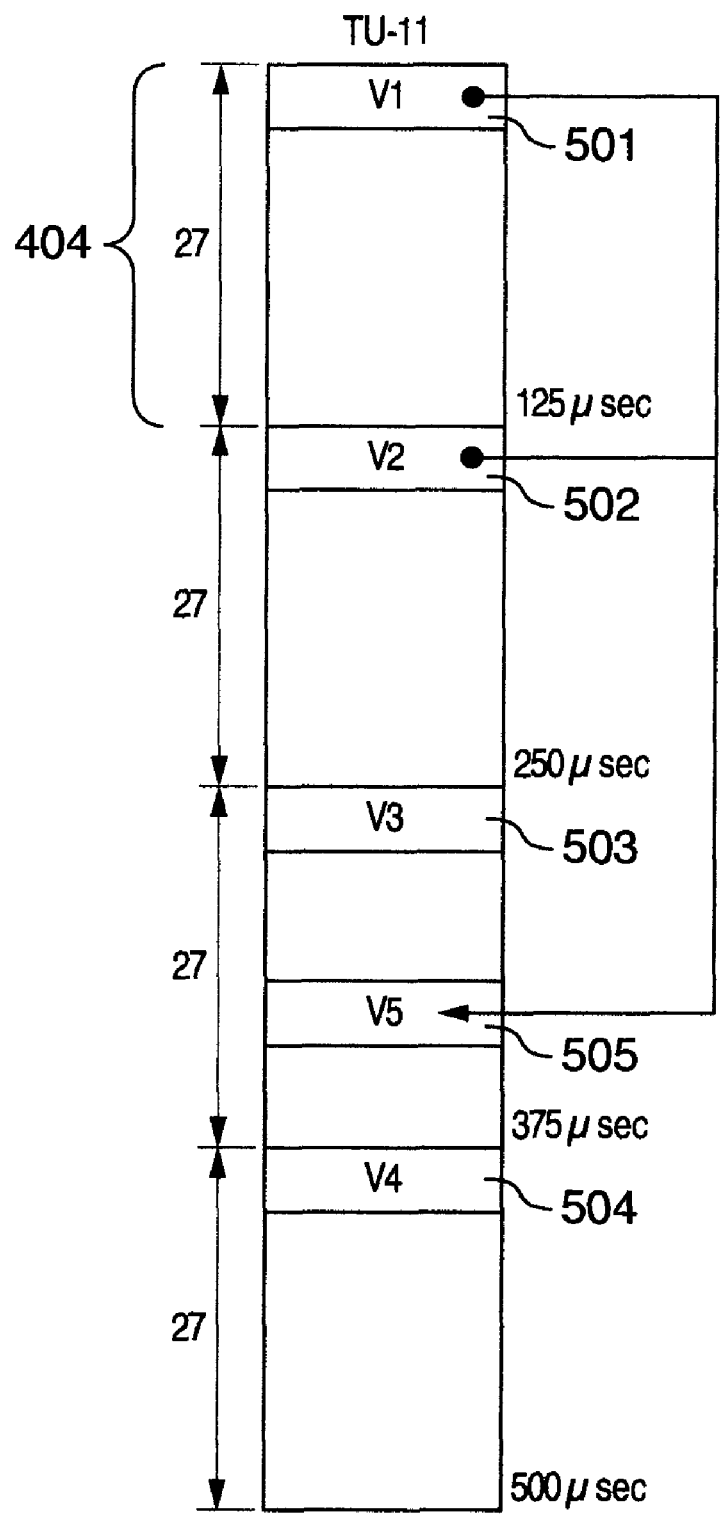
FIG. 5 is a schematic diagram showing the multi-frame configuration of the TU-11 specified in ITU-T G.707.

Next, the structure of the TU-11 path will be explained referring to FIG. 5. One TU-11 (404) in the above SDH frame format is made up of twenty-seven bytes as shown in FIG. 4, and four TU-11s are used for accumulating one data signal. As shown in FIG. 5, each TU-11 includes a low-order path overhead byte (V1 byte 501-V4 byte 504). The TU pointer is stored in the V1 byte 501 and the V2 byte 502. The position of a V5 byte 505 (indicating the start of the data signal) can be recognized from the value of the TU pointer (TU pointer value).

Figure 6:
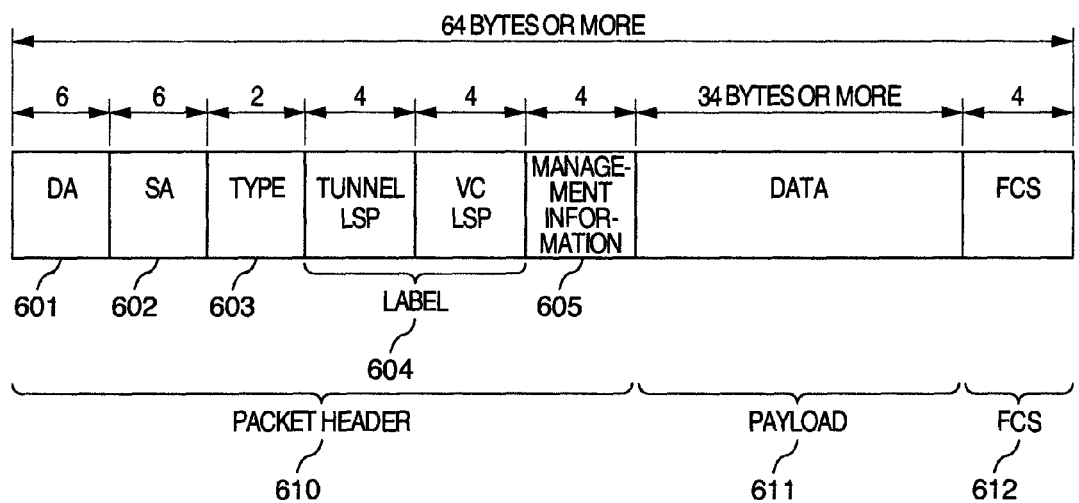
FIG. 6 is a schematic diagram showing the format of a T-MPLS frame.

Next, the format of the T-MPLS frame (packet) will be explained referring to FIG. 6. The T-MPLS frame is made up of a packet header 610, a payload 611 for storing data, and an FCS (Frame Check Sequence) 612 to be used for checking whether there exists an error in the whole frame. The packet header 610 includes a destination address (DA) 601, a source address (SA) 602, a Type 603, a label 604 (representing the destination of the packet) and a management information byte 605 (storing information for the management of the payload) (some may be specified in IEEE 802.3). The length of the payload data (excluding the packet header 610 and the FCS 612) has to be 34 bytes or more since the minimum packet length specified in IEEE 802.3 is 64 bytes and the lengths of the packet header 610 and the FCS 612 are 26 bytes and 4 bytes, respectively.

Next, the details of the SDH interface unit 111 (112) of the packet transmission device 101 in this embodiment will be explained referring to FIG. 7. A characteristic of this embodiment is the method of accommodating SDH frames in packets. Among the functional blocks in the packet transmission device 101, the SDH interface unit 111 (112) has several key features.

A section high-order path terminating unit 711 in the SDH interface unit 111 executes necessary terminating processes (section overhead termination, AU pointer termination and high-order path overhead termination specified in ITU-T G.707) to the SDH signal received from the external device.

Subsequently, a low-order path pointer terminating unit 712 recognizes the position of the V5 byte from the value of the TU pointer formed by the V1 byte and the V2 byte.

Figure 8:
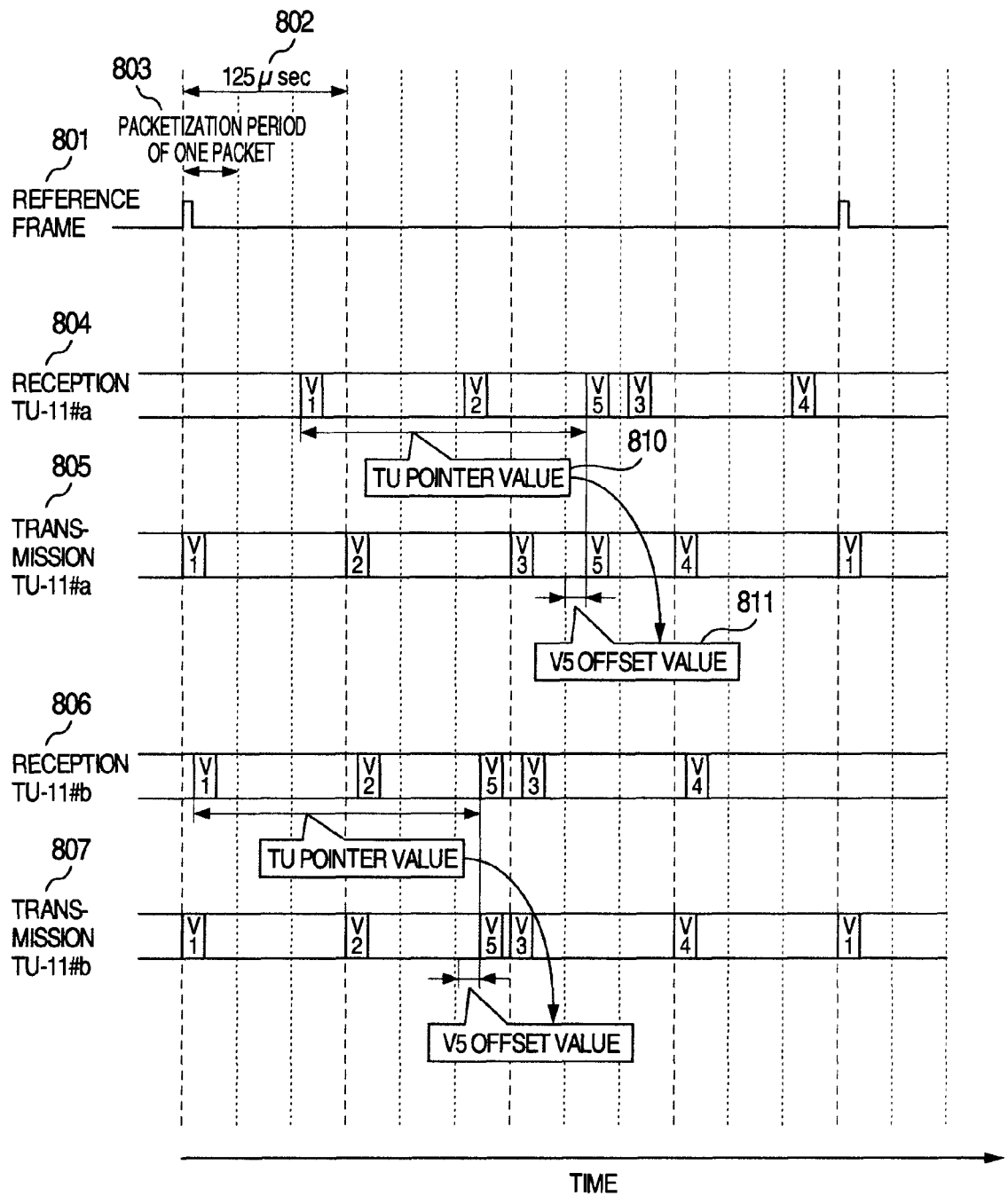
FIG. 8 is a schematic diagram showing an example of calculation of a V5 offset value.

The details of the process of recognizing the position of the V5 byte will be explained here referring to FIG. 8. A reference phase generating unit 710 in the SDH interface unit 111 distributes reference frames 801 to the functional blocks of the device (SDH interface unit 111) based on the reference frame pulse/clock distributed from the reference frame pulse/clock distributing unit 171 of the packet transmission device 101. The low-order path pointer terminating unit 712 receives TUs having various V5 phases (reception TU-11#a (804), reception TU-11#b (806)) and recognizes the position of the V5 byte 505 (indicating the start of the data signal) from the value of the TU pointer formed by the V1 byte 501 and the V2 byte 502. Up to this point, the SDH interface unit 111 executes exactly the same process as specified in ITU-T G.707.

The duration of one TU-11 path is 125 μseconds (802). The duration (125 μsec) is segmented into short time periods in order to reduce the delay caused by the packetization. In the example of FIG. 8, 125 μsec is segmented into three packetization periods 803. For transmission TU-11#a (805) and transmission TU-11#b (807), the byte positions of the V1 byte 501 and the V2 byte 502 are determined based on the reference frames 801. Since the position of the V5 byte 505 indicating the start of the data has to be maintained between the reception and transmission, the transmitting-side V5 position is recalculated. Specifically, a phase comparator unit 720 compares the position (phase) of the V5 byte 505 recognized by the low-order path pointer terminating unit 712 with the phase of the reference frame 801. Based on the phase difference obtained by the phase comparator unit 720, a pointer recalculation unit 721 recalculates the pointer (TU pointer value 810) and obtains a V5 offset value 811 in the packet to be transmitted.

The process flow will be explained below referring again to FIG. 7. The signals processed by the low-order path pointer terminating unit 712 are buffered by a reception buffer unit 714 (for the length of the low-order path data to be accommodated in the packet) and then assembled by a packetization processing unit 716 (connected with the reception buffer unit 714) into a T-MPLS frame (packet). The reading and writing from/to the reception buffer unit 714 are executed under the control of a reception buffer write control unit 713 and a reception buffer read control unit 715.

Figure 9:
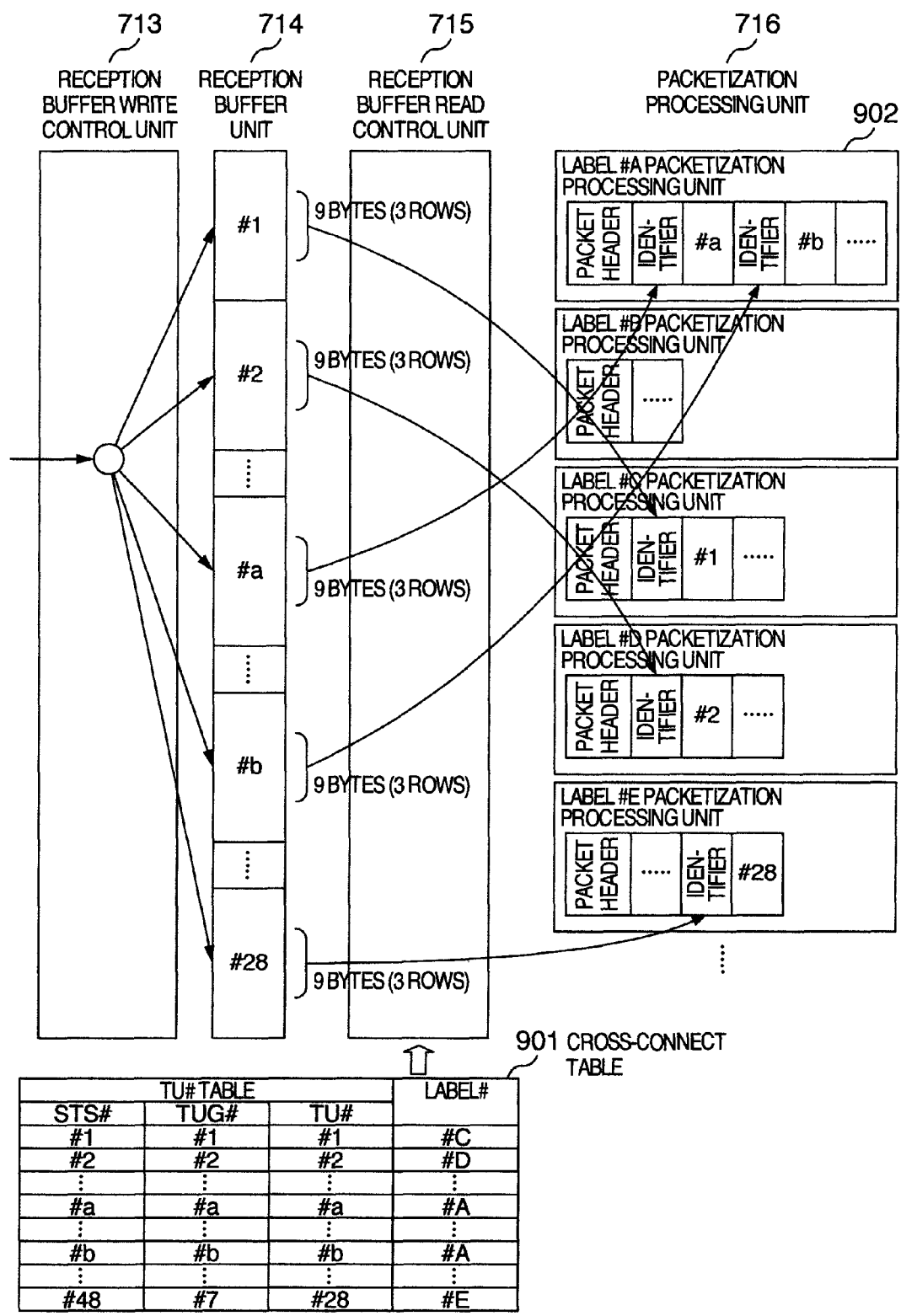
FIG. 9 is a schematic diagram showing an example of a process for packetizing time-division multiplexed signals.

The flow of a series of processes executed by the reception buffer write control unit 713, the reception buffer unit 714, the reception buffer read control unit 715 and the packetization processing unit 716 will be explained below referring to FIG. 9. The reception buffer write control unit 713 reads out the signals from the low-order path pointer terminating unit 712 (see FIG. 7) according to the SDH multiplexing rules shown in FIG. 4. For example, the reception buffer write control unit 713 in this embodiment reads the signal in regard to each TU-11 (in units of 9 bytes) shown at the bottom of FIG. 4 and writes the signals (read out from the low-order path pointer terminating unit 712) to a buffer area of the reception buffer unit 714 (one of #1-#28 in the example of FIG. 9) that has been specified for each TU, by which the reception buffer unit 714 is allowed to store continuous data for each TU number. Incidentally, the data length (9 bytes (3 rows)) of each low-order path buffered in the reception buffer unit 714 shown in FIG. 9 is just an example.

V5 position information (information on the position of the V5 byte 505) regarding the data stored in each TU is also stored at the same time. An example of the storage of the V5 position information is shown in FIGS. 10A-10D. In the example of FIGS. 10A-10D, a V5 offset buffer 722 is formed for each TU buffered in the reception buffer unit 714. The V5 offset buffer 722 is provided in parallel with the reception buffer unit 714 in FIG. 7. The V5 offset buffer 722 stores information on whether a V5 byte exists in each TU-11 area (TU-11#1-TU-11#28) (V5 presence/absence information) and information on the offset of the V5 byte (V5 offset value) when there exists a V5 byte.

In the example of FIGS. 10A-10D, V5 presence/absence information "1" and a V5 offset value "2" (for the case where there exists a V5 byte) have been stored in the V5 offset buffer 722 for TU-11#1 since there exists the V5 byte in the area of the reception buffer unit 714 for TU-11#1 and the offset of the V5 byte is "2". Since no V5 byte exists in the area of the reception buffer unit 714 for TU-11#2, V5 presence/absence information "0" and a V5 offset value "0" (for the case where no V5 byte exists) have been stored in the V5 offset buffer 722 for TU-11#2.

The reception buffer read control unit 715 accommodates the signal of each TU in an appropriate packet by referring to a cross-connect table 901 accommodated in a storage unit 731 of an SDH interface unit monitoring/control unit 730. The cross-connect table 901 accommodated in the storage unit 731 is created based on information received from the intra-device monitoring/control unit 151. Each label # in the cross-connect table 901 (#A, #E, etc. in FIG. 9) is unique identification information which has been created by an identifier creating unit 723 in regard to each SDH interface unit as the destination of a TU path. The label # is stored in each packet by the reception buffer read control unit 715.

Multiple pieces of TU data having the same destination (the same destination SDH interface unit) can be stored in the same packet since they (TU data) can be transmitted to the destination SDH interface unit without disassembling the packet in the middle of the path (route). The packetization processing unit 716 packetizes multiple TU paths having the same destination (The TU paths are read out from the reception buffer unit 714 by the reception buffer read control unit 715 in regard to a particular label #) into a T-MPLS packet. For example, the packetization regarding the label #A is carried out by a label #A packetization processing unit 902 (see FIG. 9) of the packetization processing unit 716, by which TU-11#a and TU-11#b are accommodated in a T-MPLS packet.

An example of the T-MPLS frame (packet) corresponding to the label #A is shown in FIG. 11. The T-MPLS frame in this embodiment is made up of the packet header 610, identifiers 1101 and 1103, TU-11 data 1102 and 1104 and the FCS 612. The TU-11 data 1102 and 1104 are the data of TU-11#a and TU-11#b which have been read out from the reception buffer unit 714 shown in FIG. 7. Each identifier (1101, 1103) is additional information on each TU path. The identifier (1101, 1103) includes information on time slots (STS number, TUG number, TU number) in the destination SDH interface unit of the TU path indicated by the cross-connect table 901 and information on the presence/absence and offset of the V5 byte in the TU data stored in the T-MPLS frame. The information enables the destination SDH interface unit to restore the TU data (accommodated in the packet) in the particular time slots of an SDH frame. By the above process, multiple pieces of TU data having the same destination can be stored in one packet, by which the accommodating efficiency of the packet can be increased. Further, the transmission delay can be reduced since multiple pieces of TU data contained in the same STM-0 frame can be accommodated in one packet.

Figure 7:
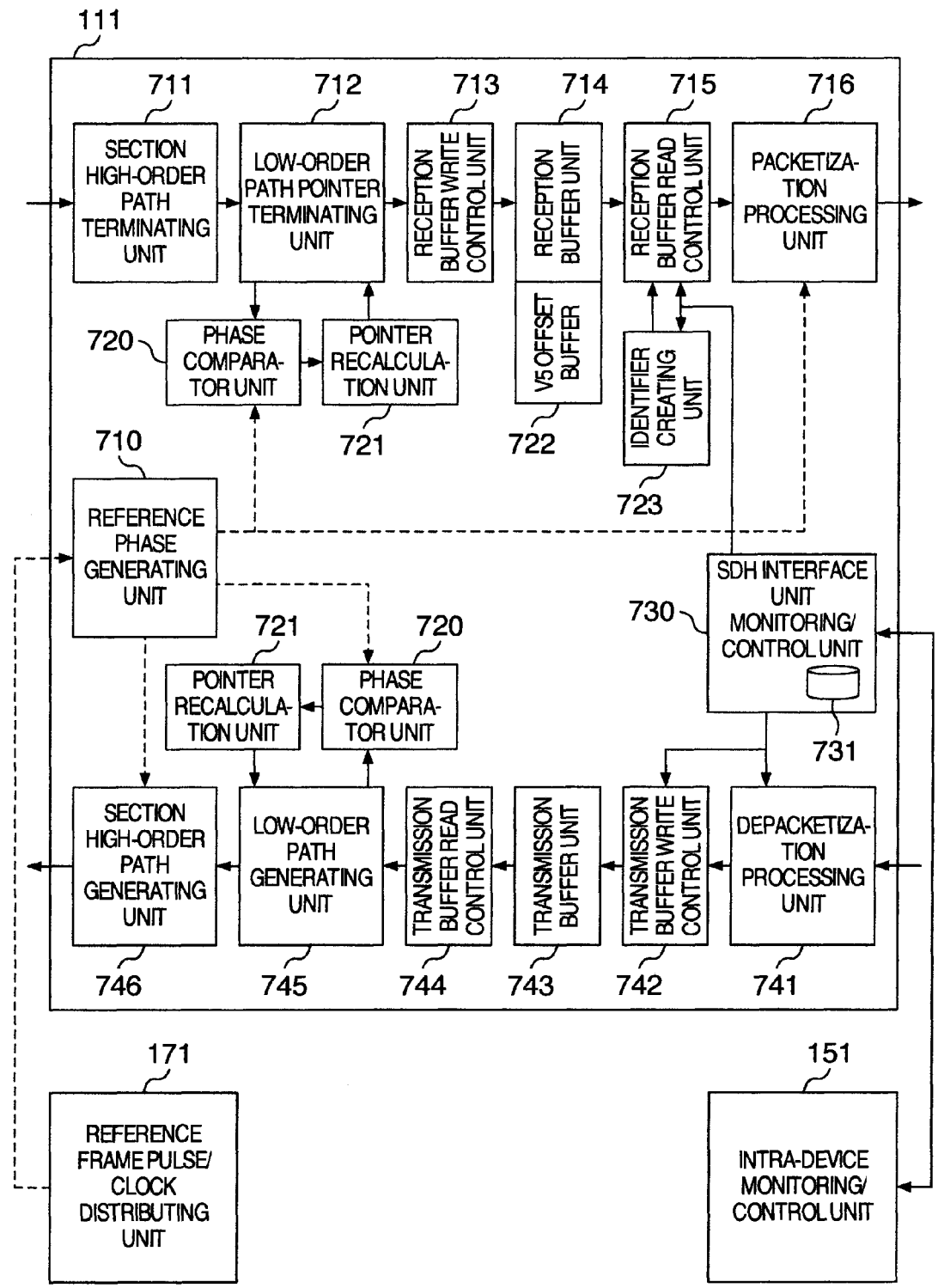
FIG. 7 is a block diagram showing an example of the configuration of an SDH interface unit of the packet transmission device.

Next, a method employed by the SDH interface unit 215 (of the packet transmission device 203 receiving the packet) for restoring the TU data (which have been packetized as shown in FIG. 7) into an SDH frame will be explained below. In the packet transmission device 203, the T-MPLS frame transferred from the packet switch 141 (see FIG. 1) to the SDH interface unit 215 is inputted to a depacketization processing unit 741 (see FIG. 7) of the SDH interface unit 215. The payload of the packet (T-MPLS frame) shown in FIG. 11 is separated into the identifiers 1101 and 1103 and the TU-11 data 1102 and 1104 and then handed over to a transmission buffer write control unit 742.

Figure 12:
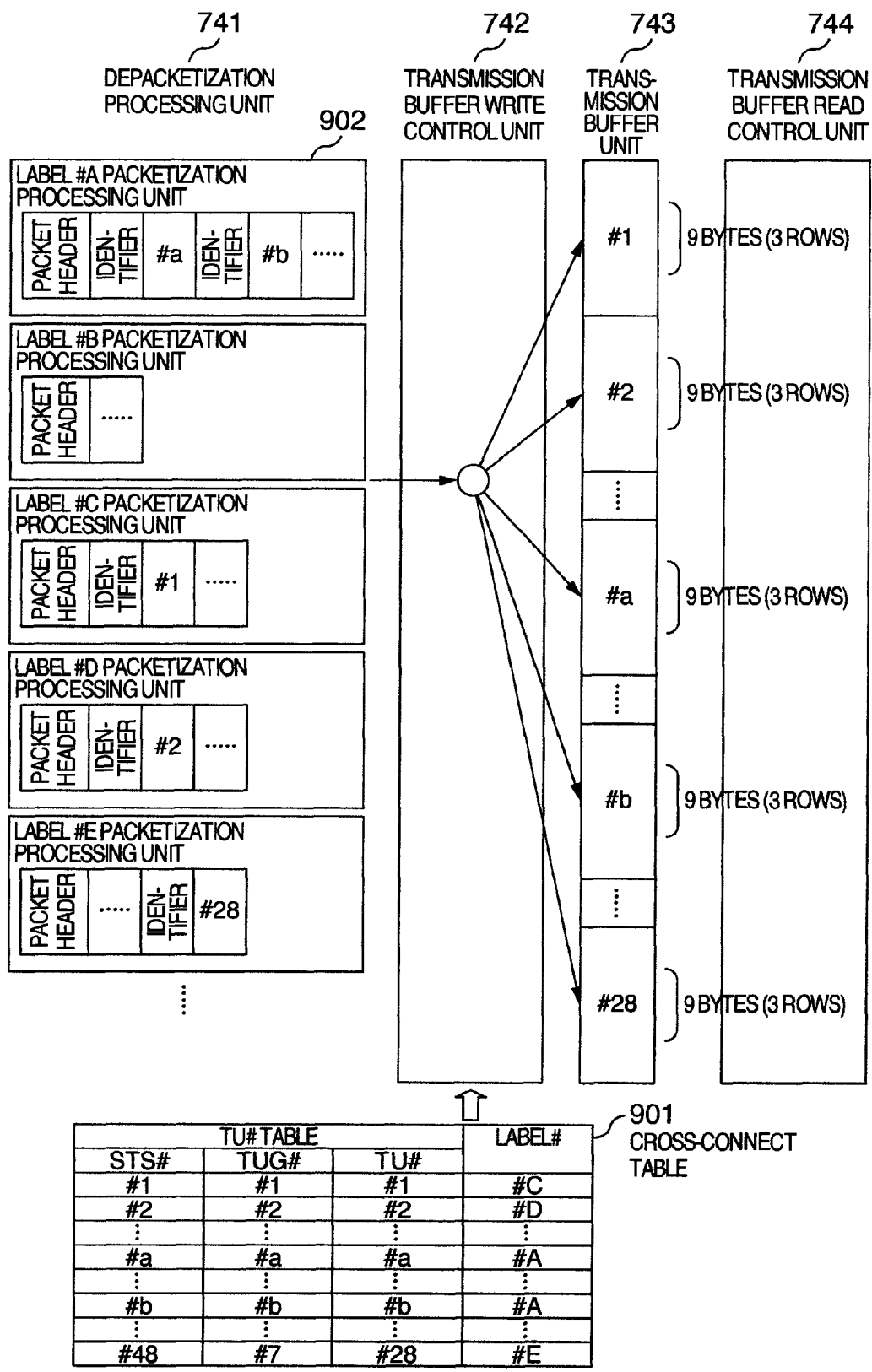
FIG. 12 is a schematic diagram showing an example of a process for restoring signals contained in packets into time-division multiplexed signals.

The flow of a series of processes executed by the transmission buffer write control unit 742, a transmission buffer unit 743 and a transmission buffer read control unit 744 (see FIG. 7) will be explained below referring to FIG. 12. According to the information on the time slots (STS number, TUG number, TU number) in the destination SDH interface unit contained in the received identifiers 1101 and 1103 and the label # in the cross-connect table 901, the transmission buffer write control unit 742 stores each piece of TU-11 data (1102, 1104) and the information on the presence/absence and offset of the V5 byte in the TU data (contained in each identifier (1101, 1103)) in an area of the transmission buffer unit 743 that has been specified for each TU. In regard to the correspondence between the transmission buffer unit 743 and the information on the presence/absence and offset of the V5 byte, it may be configured to provide a V5 offset buffer for each TU-11 path buffered in the transmission buffer unit 743 similarly to the V5 offset buffer 722 for the reception buffer unit 714 shown in FIGS. 10A and 10B.

The transmission buffer read control unit 744 extracts the TU data, the identifier and the information on the presence/absence and offset of the V5 byte from the transmission buffer unit 743 and hands over the extracted data and information to a low-order path generating unit 745. The low-order path generating unit 745 generates a low-order path signal using the data and information received from the transmission buffer read control unit 744. At the same time, the low-order path generating unit 745 calculates a TU pointer value by comparing the V5 position read out from the transmission buffer unit 743 with the reference phase (which is a phase of the reference frame 801 distributed from the reference phase generating unit 710).

An example of the TU pointer calculation process will be explained in detail below referring to FIG. 13. The reference phase generating unit 710 in the SDH interface unit 111 (215) distributes the reference frames 801 based on the reference frames distributed from the reference frame pulse/clock distributing unit 171 of the packet transmission device 101 (203). The low-order path generating unit 745 receives TUs having various V5 phases (reception TU-11#a (1304), reception TU-11#b (1306)) and recognizes the position of the V5 byte 505 (indicating the start of the data signal) from the V5 offset value 1310. The low-order path generating unit 745 determines the positions of the V1 byte 501 and the V2 byte 502 in each transmission TU (transmission TU-11#a (1305), transmission TU-11#b (1307)) based on the reference frames 801. The phase comparator unit 720 compares the position (or the phase) of the V5 byte 505 recognized by the low-order path generating unit 745 with the phase of the reference frame 801. Based on the result of the phase comparison received from the phase comparator unit 720, the pointer recalculation unit 721 executes the pointer recalculation and thereby obtains the TU pointer value 1311 for each transmission TU. After the calculation of the TU pointer, the low-order path generating unit 745 assembles TU frames using the TU pointers and the TU data. Subsequently, a section high-order path generating unit 746 assembles a high-order path containing the TU frames, executes the assembling into an SDH frame, and transmits the SDH frame to the external connection device.

As described above, the transmission device (packet transmission device 101) in accordance with this embodiment comprises one or more interface units each of which is connected with a transmission line outside the device and accommodates SDH/SONET signals specified by ITU-T G.707 or Telcordia GR-253-CORE, one or more interface units each of which accommodates signals specified by IEEE 802.3, a clock unit which generates reference frames and distributes the reference frames to the interface units in the device, and a packet switch unit which properly makes connections between the interface units.

The transmission device of this embodiment further comprises a unit which distributes reference frame pulses (each of which corresponds to one multi-frame cycle of a low-order path specified by ITU-T G.707 or Telcordia GR-253-CORE) to all the interface units (in the device) accommodating SDH/SONET signals.

In the transmission device of this embodiment, a reception functional unit of the interface unit accommodating SDH/SONET signals includes a unit which recognizes the position of the V5 byte by interpreting a pointer in the low-order path, a unit which stores low-order paths having the same destination (interface unit to which the paths are connected) in the same packet, and a unit which adds an identifier (representing the V5 position and a time slot number in the destination of the low-order paths) to the start of each low-order path.

In the transmission device of this embodiment, a transmission functional unit of the interface unit accommodating SDH/SONET signals includes a unit which receives each packet assembled in the reception functional unit (of a different transmission device) and maps the low-order paths stored in the packet into frames specified in ITU-T G.707 or Telcordia GR-253-CORE according to the time slot information included in the identifier of each low-order path and a unit which generates a low-order path pointer based on the phase relationship between the V5 byte position information included in the identifier and the reference frames distributed from the clock unit.

The transmission device in accordance with this embodiment may further comprise a unit which acquires low-order path routing information from an external control device and converts the acquired information into packet destination addresses and labels and a unit which holds information about the conversion in a table. The transmission device of this embodiment may comprise a unit which accommodates PDH signals specified in ITU-T G.703 or Telcordia GR-253-CORE and converts the PDH signals into different signals (TU-11, TU-12, TU-2, VT1.5 SPE, VT2 SPE, VT3 SPE or VT6 SPE) specified in ITU-T G.703 or Telcordia GR-253-CORE.

As described above, the transmission device in accordance with this embodiment of the present invention accommodates (stores) multiple low-order paths in one packet, by which the packet length can be increased even when short low-order path data are stored in each packet, and consequently, the accommodating efficiency of the packet can be increased. Low-order paths having the same destination (destination interface unit) are collected (selected) and the collected low-order paths having the same destination are accommodated in the same packet. Thus, the packet can be transmitted to the destination SDH interface unit without the need of disassembling the packet at a node in the middle of the path (route).

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A transmission device comprising:
a plurality of first interfaces, a first interface of which receives time-division multiplexed signals from an external device in units of frames;
a switch which is connected with the first interfaces and sets paths of the signals received from the first interface in regard to each packet; and
a plurality of second interfaces, a second interface of which is connected with the switch, receives the signals from the first interface via the switch, and transmits the received signals to a different transmission device in units of packets,
wherein the first interface selects signals having the same destination from the signals contained in the received frame and accommodates the selected signals having the same destination in one packet,
wherein when the second interface receives signals in units of packets from a different transmission device, the second interface sends each of the received packets to one of the first interfaces of the transmission device or a different transmission device via the switch, and
wherein the first interface judges whether the destinations of the signals contained in the received frame are the same or not based on whether or not the signals should be transmitted to the same first interface of a different transmission device,
wherein the first interface includes:
a buffer unit having areas each of which is used for storing signals contained in each of prescribed time slots of the frame;
a cross-connect table in which each of the time slots is associated with a label which is used for recognizing one first interface of a different transmission device to which the signals contained in the time slot should be transmitted; and
a packetization processing unit which reads out signals of time slots associated with the same label in the cross-connect table from the buffer unit in regard to each label and accommodates the extracted signals corresponding to the same label in one packet.

2. The transmission device according to claim 1, wherein:
the first interface accommodates STM (Synchronous Transfer Mode) frames containing signals that have been time-division multiplexed according to SDH (Synchronous Digital Hierarchy) or SONET (Synchronous Optical Network), and
the second interface accommodates Ethernet signals specified in IEEE 802.3, and
the buffer unit stores signals contained in TUs (Tributary Units) multiplexed in the STM frame in regard to each TU.

3. The transmission device according to claim 2, further comprising a reference frame distributing unit which distributes reference frames to components of the transmission device,
wherein the first interface recalculates the position of a V5 byte contained in the TUs using the reference frames distributed from the reference frame distributing unit and accommodates the result of the recalculation in the signal sent out to the switch.

4. A transmission device comprising:

a plurality of first interfaces, a first interface of which receives signals from a different transmission device in units of packets;

a switch which is connected with the first interfaces and sets paths of the signals received from the first interfaces in regard to each of the packets; and a plurality of second interfaces, a second interface of which is connected with the switch, receives the signals in units of packets from the first interface via the switch, and transmits the received signals to an external device in units of frames containing time-division multiplexed signals, wherein the second interface receiving the signals in units of packets accommodates signals contained in one packet in separate time slots of one frame, wherein:

the signals in units of packets received by the second interface contains time slot information indicating in which time slot of the frame each signal contained in the packet to be accommodated, and the second interface includes:

a buffer unit having areas each of which is used for storing signals to be stored in each of prescribed time slots of the frame;

a buffer write control unit which separates the signals in units of packets received from the switch into signals corresponding to separate time slots by referring to the time slot information and stores the signals corresponding to separate time slots in separate areas of the buffer unit each of which has been specified for each of the time slots; and a path generating unit which generates time-division multiplexed signals in units of frames from the signals separately accommodated in the areas of the buffer unit specified for the time slots.

5. The transmission device according to claim 4, wherein:

the first interface accommodates Ethernet signals specified in IEEE 802.3, and the second interface accommodates STM (Synchronous Transfer Mode) frames containing signals that have been time-division multiplexed according to SDH (Synchronous Digital Hierarchy) or SONET (Synchronous Optical Network), and the buffer unit stores signals to be stored in TUs (Tributary Units) to be multiplexed in the STM frame in regard to each TU.

6. The transmission device according to claim 5, further comprising a reference frame distributing unit which distributes reference frames to components of the transmission device, wherein:

the signals in units of packets received by the second interface contain information on the presence/absence and the position of a V5 byte, and the first interface calculates a TU pointer using the reference frames distributed from the reference frame distributing unit and the information on the presence/absence and the position of the V5 byte.

* * * * *